United States Patent Office 3,182,759
Patented May 11, 1965

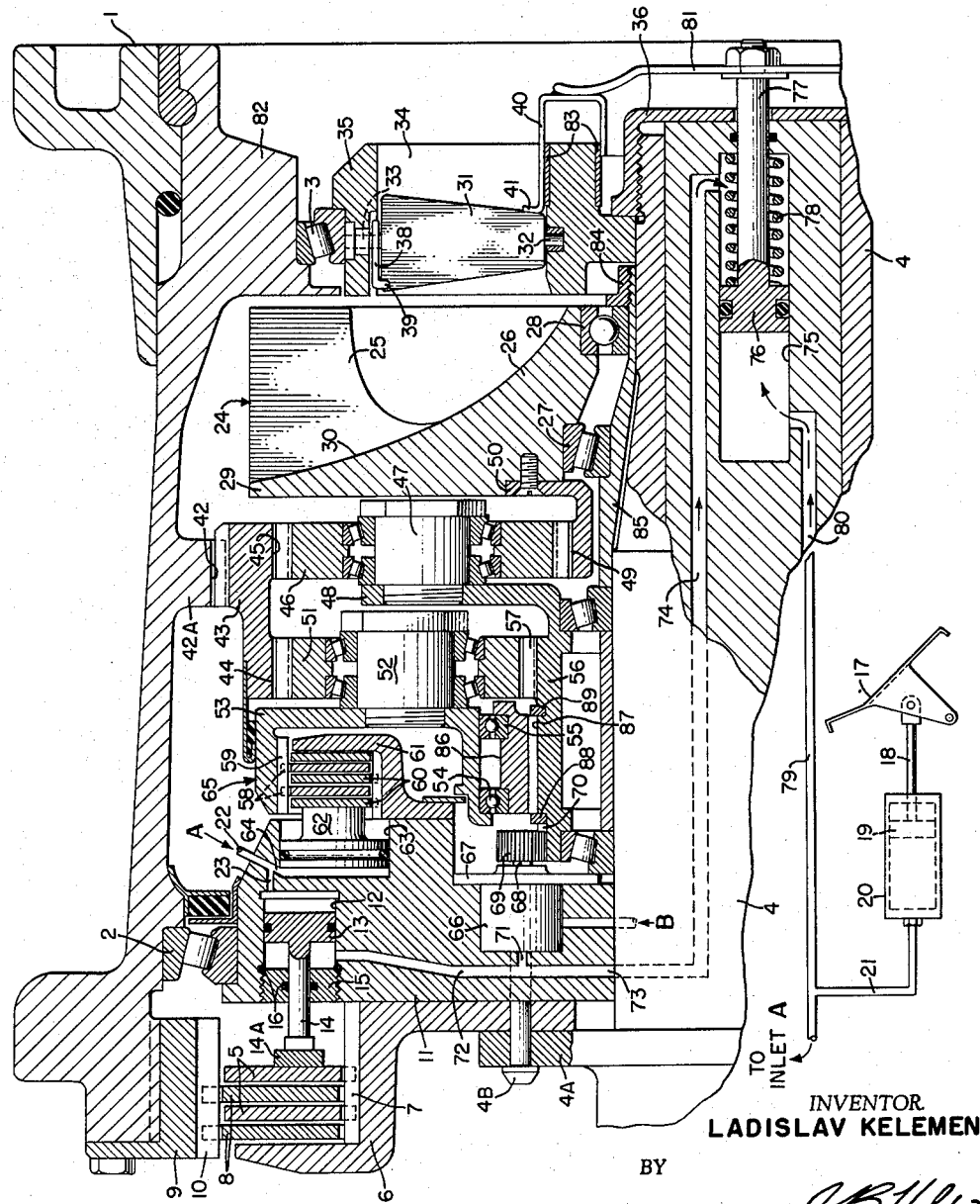

3,182,759
COMBINED TURBO- AND FRICTION-BRAKE WITH ADJUSTABLE SHROUDING MEANS AND CONTROL MEANS THEREFOR
Ladislav Kelemen, Akron, Ohio, assignor to The Goodyear Tire & Rubber Company, Akron, Ohio, a corporation of Ohio
Filed July 11, 1963, Ser. No. 294,413
8 Claims. (Cl. 188—86)

The present invention relates to turbo-brakes, and particularly to the combination of a substantially conventional friction brake with a turbo-brake having an adjustable shrouding means in the turbo-brake to control air flow thereto.

Heretofore there have been various tubo-brake constructions proposed to provide a braking action for a rotating wheel by rapid rotation of the impeller in the turbo-brake for drawing large volumes or masses of air rapidly into the turbo-brake impeller and discharging such air masses therefrom after having performed certain work thereon to obtain braking action on the associated wheel. In some instances, such turbo-brake means have been used in association with at least substantially conventional friction brakes as are provided on many wheels today. One problem created by the addition of a turbo-brake to a conventional friction brake is that of how the ratios of braking action obtained from the friction brake and the turbo-brake are to be determined and how maximum efficiency of each such type of braking action can be obtained in the stopping of a rotating wheel.

It is usually desirable that a turbo-brake be primarily used during the initial high speed operations of the wheel when brake forces are applied thereto, and it likewise is desirable to transfer, gradually, the effective braking action from the turbo-brake over to the friction brake, and to obtain such transfer of braking forces from one brake to the other rapidly, effectively and efficiently.

It therefore is the general object of the present invention to provide a new and improved type of a turbo-brake in combination with a friction brake for a wheel, and to obtain a braking action which is characterized by the primary initial braking action being obtained from the turbo-brake, and to gradually transfer braking action from the turbo-brake over to the friction brake, as the vehicle on which the brake means is mounted is slowed down.

Another object of the invention is to provide a small rotary type hydraulic pump on a vehicle wheel assembly, to drive such pump at a speed proportionate to that of the associated wheel, which pump is adapted to have an output pressure proportional to the rotative speed of drive thereof, and to use such pump output pressure for controlling brake actions in the wheel assembly.

Further objects of the invention are to provide adjustable vane or shrouding means in association with a turbo-brake impeller, and which shrouding means are adjustably movable to and from open and closed positions; to provide a hydraulic pressure in a wheel assembly which is proportional to the speed of rotation of the wheel; to utilize a hydraulic pump pressure for opposing friction brake action by a conventional actuated hydraulic means in a friction braking system; to control the setting of adjustable shrouding or vane means in a turbo-brake by a differential pressure between manually actuated hydraulic means in the braking system, and a wheel driven slave pump output pressure to urge the vanes to an open position by only the resultant pressure component of the friction brake system; to provide a turbo-brake with increased braking action as the wheel slows down; to provide a compact, novel and improved turbo-brake and control system therefor readily positionable in a wheel and axle assembly; to provide a sturdy, long-lived type of a turbo-brake means adapted to give a long service life with a minimum of maintenance thereon; and to provide a novel, improved turbo-brake and friction brake means adapted for combined use in braking a wheel.

The foregoing and other objects and advantages of the present invention will be made more apparent as the specification proceeds.

When referring to corresponding members shown in the drawings and referred to in the specification, corresponding numerals are used to facilitate comparison therebetween.

Attention now is particularly directed to the accompanying drawing wherein a wheel and brake unit embodying the principles of the invention is shown in vertical cross section.

The present invention, generally speaking, in one embodiment thereof, relates to a turbo-brake assembly including an axle, a wheel, and means journalling the wheel on the axle, and where the assembly comprises an impeller journalled on the axle and adapted to pull air thereinto and perform work thereon as the air is passed therethrough, planetary gear means connecting the wheel to the impeller to drive it by rotation of the wheel, a rotary hydraulic pump having an outlet with an output pressure proportionate to the speed of the wheel, means connecting the pump to the planetary gear means to be driven thereby at a speed proportional to the speed of the wheel, a plurality of shrouds adjustably positioned adjacent the impeller to control air flow thereto, and means operatively connecting the pump output to the shrouds to control the positioning thereof and to open the shrouds gradually as the output pressure of the pump decreases.

Reference now is particularly directed to the details of the structure shown in the drawings, and a novel turbo-brake of the invention is shown in association with a wheel 1. This wheel 1 may be of any suitable construction and is journalled on conventional roller bearings 2 and 3 that operatively position the wheel 1 on an axle 4, as hereinafter described in more detail. Substantially conventional friction brake means are provided for the wheel 1 and include a plurality of brake discs or plates 5, 5 that are operatively secured to a brake support plate or back-up member 6 that is in turn itself suitably secured to the axle 4, which brake discs or plates 5, 5 can move axially of this brake support plate 6 by engaging an axially extending key or rib 7 provided thereon, in a conventional manner. Cooperating brake discs or plate means 8, 8 are likewise secured to a carrier ring 9 that is in turn suitably secured to and rotates with the wheel 1 on a radially inner portion thereof at one end of the wheel. Such brake discs 8, 8 are also engaged with an axially extending key or rib 10 provided on a radially inner surface of the carrier ring 9 for movement axially thereof to create drive for the discs 8, 8, as is conventional in friction brakes of this type.

A substantially conventional brake housing means, or block 11 is shown in the drawings and is fixedly secured to the axle 4, through the torque flange 4A and bolts 4B. A brake cylinder 12 is formed in the brake housing 11 and a brake piston 13 is slidably received therein. A piston rod 14 engages and extends axially from the brake piston towards the brake discs 5 and 8, engaging therewith by a suitable pressure member 14A operatively secured to the end of the brake piston rod 14. It will be realized that a number of these spot-type brake cylinders 12 can be provided in the brake housing means at circumferentially spaced portions of the axle 4, or only one of those brake cylinders may be used, as desired. It also is possible to actuate the friction brake means 5, 5 and 8, 8 by other conventional means in any known manner. The open end of the brake cylinder 12 is closed as by a threaded closure disc 15, and conventional members, such as O-rings 16, seal the connection between the brake piston rod 14 and a center aperture in this closure disc 15, and also that between the closure disc 15 and brake housing cavity (cylinder) 12.

In order to actuate the friction brake means in the wheel assembly of the invention, a conventional manually actuated brake pedal 17 is provided and is shown diagrammatically in FIG. 1. The brake pedal connects to a piston rod 18 connecting to a piston 19 provided in a hydraulic cylinder 20 having an outlet connecting to the hydraulic system for hydraulic control of brake actuation on the wheel. Thus, an outlet tube 21 extends from the cylinder 20 and is diagrammatically shown as connecting to a suitable bore, or conventional inlet tube 22 operatively engaging the brake housing 11. Such hydraulic pressure inlet bore 22 connects to another bore 23 provided in the brake housing 11 and extending to the brake cylinder 12 at the axially inner end thereof for applying pressure to the piston 13 slidably received in this cylinder 12.

The turbo-brake portion of the present novel wheel assembly includes an impeller 24 which has a plurality of substantially radially extending vanes 25 provided thereon. The impeller also includes a hub 26 that is journalled on the axle 4, as by a pair of bearings 27 and 28. This hub 26, in the embodiment of the invention shown in the accompanying drawings, is of gradually increasing thickness in a radial direction from the axial outer to the axial inner end of the impeller so that in this instance the hub also forms a back-up disc 29 extending the radial length of the impeller vanes 25 at the axially inner end of the impeller. Hence, a strong impeller is formed and it has an arcuate surface 30 on the impeller hub to aid in air flow into and past the vanes 25 to aid in obtaining a smooth air flow to and through the impeller 24, as hereinafter described. The drawing clearly shows that the impeller 24 terminates radially inwardly from the inner surface of the wheel 1 to provide a passage for air flow axially of the wheel, as described hereinafter in more detail.

The entry of air to the impeller 24 is controlled by a plurality of substantially flat shroud means, or vanes 31. These vanes are positioned by means of axially extending stub shafts 32 and 33 extending from the radially inner and outer ends thereof, respectively, and which journal the vanes 31 within substantially radially extending, circumferentially spaced windows, or openings 34 formed in an annular member, or wheel bearing support 35 that extends between the wheel 1 and the axle 4 adjacent one end of the wheel 1. The wheel bearing support, or annular member 35 is secured on the axle 4, as by an axle nut 36 engaging the axle 4. Such axle nut 36 also forces the annular member 35 to abut against the bearing 3 to hold the wheel on the axle 4 against any axial movement thereon. The vanes 31 are shown continually urged towards open positions where the relatively flat vanes extend axially with relation to the axle 4 and expose the windows 34 for maximum air flow therethrough. Suitable means, such as coil springs 38, are anchored at one end (not shown) to the annular member 35 and extend around the stud shaft 33 at the upper end of each of the vanes 31 to engage the vanes at the opposite ends of the springs as at 39, to urge these vanes to open positions at all times.

The vanes 31, in relation to their opened or closed positions, are also controlled by means of a slide ring 40 that engages a radially inner portion of the annular member 35 and has a radially outwardly extending flange 41 provided thereon which bears on the lower ends of the vanes 31. With axially inwardly directed forces applied to the slide ring 40, as hereinafter described, the slide ring 40 will move axially inwardly of the wheel assembly for forcing the vanes 31 to a closed, or substantially closed position. The action of this slide ring 41 and its controls will be explained hereinafter in more detail.

In most applications of the turbo-brake means of the invention, it is desirable to drive the impeller 24 at a greater speed than the speed of rotation of the wheel 1. Thus planetary gear drive means are provided in the wheel assembly and a plurality of circumferentially spaced tang engagement members 42 are suitably formed on or secured to bosses 42A provided on the wheel 1 on its radially inner surface. A ring gear 43 is engaged with the members 42 and has a pair of axially spaced gears 44 and 45 formed on its radially inner surface. The gear 45 is shown engaged with a planetary gear 46 that is journalled by its support shaft 47 on a support plate 48. Other planetary gears (not shown) are also carried on the support plate 48 at circumferentially spaced portions thereof. The planetary gear 46 also engages and drives a sun gear 49 that in turn is secured by a flange or mounting plate 50 to a base portion of the impeller 24 for driving such impeller at a multiple speed in relation to that of the wheel 1.

A control is provided for the action of the planetary gears 46 in the planetary gear system previously described, and such means include a plurality of gears 51 that are circumferentially spaced from each other, one gear of which is shown engaged with the gear 44 of the ring gear 43. These gears 51 in effect form a second planetary system in the wheel assembly and are suitably journalled on support shafts 52 positioned on a clutch plate 53. The clutch plate 53 is journalled on bearings 54 and 55 which are mounted on a support sleeve 56 that is formed integrally with the support plate 48. The second planetary gears 51 also engage a sun gear 57 formed integrally with or attached to this support sleeve 56 and thus attached to the support plate 48. Hence, positive rotation of the secondary planetary gears 51, other than by frictional drive with the rotating wheel, will cause the support sleeve 56 to rotate on the axle 4 and in turn cause the support plate 48 to rotate on the axle and increase the relative speed of drive of the planetary gears 46 by rotating them as units around the circumference or periphery of the axle 4 to increase the speed of drive for the impeller 24. Hence, it is necessary to hold the clutch plate 53 stationary by positive acting means to thereby drive the support sleeve 56 and associated means. Thus suitable clutch means are provided in association with the clutch plate 53 to cause it to rotate at a lesser speed than the wheel 1, or to stop its rotation altogether, as desired. To achieve such result, a suitable clutch means, which may be made from a substantially conventional friction brake is shown in the drawings and it includes a pair of clutch, or brake discs 58 that are in operative engagement with an overhanging slot or rib 59 provided on the clutch plate 53 for rotation as a unit with the clutch plate, but are free for axial movement thereon. Corresponding clutch plates or brake discs 60 are shown engaged with a brake or clutch back-up plate 61 that is secured to a portion of the brake housing 11. A clutch piston 62 is received in a clutch cylinder 63 provided in the brake housing 11 adjacent the discs 58 and 60. The hydraulic braking pressure applied to the tube or bore 22 also is connected or flows to this clutch cylinder 63 by a bore 64 whereby the friction brake pressure is thus operatively associated with the clutch means provided. By increased braking pressure, the clutch means, indicated as a whole by the numeral 65, will be engaged and will stop rotation of the clutch plate 53 to provide increased drive speed for the impeller 24, as described hereinbefore.

Yet another important feature of the invention relates to the provision of a rotary type hydraulic pump 66 that is positioned on a suitable fixed portion of the housing, or similar means secured to the axle 4. Thus the pump 66 is secured within a cavity in the brake housing 11 by a cover plate 67 secured to the brake housing. Such pump 66 has a drive shaft 68 extending therefrom with a gear 69 provided thereon and meshed with a corresponding gear 70 provided on, or suitably secured to the support sleeve 56 referred to hereinbefore. The support sleeve 56, in all events, will rotate at a speed proportional to that of the wheel 1, and thus will cause the pump 66 to be driven at a speed proportional to that of the wheel. The pump 66 has an outlet conduit, or tube 71 connecting thereto. This pump 66 is of the type that has its outlet pressure proportionate to the speed of drive of the pump so that the pressure provided at this outlet 71 is proportional to the rotating speed of the wheel 1. Such outlet 71 connects by a suitable conduit 72 and associated bore means to the brake cylinder 12 on the opposite side of the brake piston 13 from the friction brake actuating pressure tube or bore 23 that supplies the actuating pressure to this friction brake system. Hence, the resultant friction brake pressure applied only amounts to the net differential between the outlet pressure of the pump 66, as applied to one face of the brake piston, in relation to the braking pressure applied to the larger face area on the opposed face surface of this piston 19.

The pressure output from the pump 66 is also used to control the positioning of the vanes 31, and thus a second conduit 73 connects to the output 71 of the pump and in turn extends through a suitable bore, or equivalent means 74 provided on the axle 4 to extend to a cylinder 75 provided in the axle 4 at the end thereof adjacent the vanes 31. A piston 76 is slidably positioned in the cylinder 75 and it has a piston rod 77 extending therefrom and protruding beyond the end of the axle 4. Such bore 74 connects to the cylinder 75 adjacent the axially outer end thereof, and a spring 78 is also usually received between such end of the cylinder 75 and the piston 76 whereby the pump outlet pressure and the spring 78 combine to to set up a force on the piston rod 77 urging it axially inwardly at all times at a pressure substantially proportional to the outlet pressure of the pump 66.

The action of the piston 76 in the cylinder 75 is opposed by means of the manually actuated hydraulic braking pressure provided in the outlet tube 21 from the cylinder 20. Such outlet tube 21 also connects to a tube, or conduit 79 and a connecting bore 80 provided in the axle to the opposite end of the cylinder 75 from that to which the bore 74 connects. Hence, it is seen that the hydraulic pressure of the friction brake means, as applied by the driver of a vehicle, or pilot of an airplane, to the brake pedal 17 opposes the action of the pump pressure and that of the spring 78 to urge the piston 76 axially outwardly. The piston rod 77 has a suitable connecting plate, or arm 81 secured to it and extending out radially to engage the slide ring 40 whereby the position of the piston rod 77 and the connecting plate 81 carried thereby will determine the ultimate position of the vanes 31. The vanes 31 can be turned in a radial direction by axial movement of the slide ring 40 to substantially closed positions, or be permitted to move to open, or to adjusted partially open positions by the action of the coil springs 38 when the slide ring 40 has been moved axially outwardly.

From the foregoing, it will be seen that the resultant positioning of the vanes 31 from their initially closed positions, as set up by the spring 78 in its action in positioning the piston 76 in the cylinder 75, will depend on the output pressure of the pump 66 and its action in permitting the opening movement of these vanes 31 by the friction brake pressure. It will be seen that initially these vanes 31 should be in substantially closed positions and gradually be opened so that no excessive forces are set up in the impeller 24, or associated wheel and positioning means but that a gradual turbo-brake braking action be obtained, producing a constant torque and consequent constant deceleration of the vehicle. The coordination of the friction brake pressure and the pump pressure will permit this gradual application of braking forces by the turbo-brake means. Likewise, the output of the pump 66 will oppose the application of friction braking action in the wheel assembly whereby the friction brake means will only be gradually actuated and the application of excessive frictional braking forces to the wheel will be avoided.

It should be appreciated that any suitable or necessary types of reservoirs and return conduits, as may be required, are used in association with the pump 66, and the brake control piston or cylinder 20 in the apparatus of the invention. Inlet B for the pump 66 would connect to such reservoir.

The bearing 2 is positioned on the outer periphery of the brake housing 11 to support the wheel on the axle, and the bearing 3 is in turn positioned between the outer periphery of the annular member 35 and the adjacent inner surface of the wheel.

It will be seen that the annular member 35 in association with the vanes 31 substantially closes the one end of the wheel 1, and that air flow through the annular member 35 can be obtained by opening the vanes 31 when the wheel 1 is rotating. As this volume of air passes through the windows 34 in the annular member 35 to the impeller 24, the velocity of the air is rapidly increased by the impeller and such work performed rapidly on large volumes of the air passing into the wheel will produce the desired turbo-brake action. The air discharged is moving substantially radially outwardly from the impeller blades 25 and then preferably is discharged at the opposite end of the wheel 1. The wheel has a downwardly extending flange or rib 82 formed thereon adjacent the axially outer end of the impeller 24 and the discharged air will then move axially of the wheel 1 in the space between the ring gear 43 in the planetary gear system used in the turbo- and friction-brake means of the invention and the wheel. Such air will continue to flow axially through the wheel 1 and will be discharged through any suitable openings (not shown) formed in the brake housing 11. Or, the brake housing 11 may be located at one or a plurality of equally circumferentially spaced portions of the wheel assembly to provide relatively large openings for air flow therethrough to exhaust from the interior of the wheel 1.

It will be realized that the relationship between the flange 41 of the slide ring 40 and the vanes 31 is such that any axially directed forces applied to the vanes by the slide ring 40 will urge such vanes towards their closed positions. Such vanes 31 normally would not be completely closed when the piston 76 is at its innermost position. Any suitable slide bearing means 83 is provided on the annular member 35 to position the slide ring 40.

It will be seen that the impeller 24 and associated drive means therefor are all positioned within the axial margins of the wheel 1. The impeller 24 and associated means are separately retained on the axle 4 by a nut 84 that engages a sleeve 85 suitably secured to the axle 4.

Bearings 54 and 55 are positioned on the support sleeve 56 by a bearing support ring 86 that engages splines 87 on the support sleeve. Suitable split lock rings 88 and 89 seat on the support sleeve 56 to retain the bearing support ring 86 in position.

It will be seen that a relatively large volume of air, at substantially atmospheric temperature, is caused to move axially through the wheel 1. Such air flow will aid materially in cooling the components of the clutch means 65, as well as the friction brake discs 5 and 8 in the friction brake means used on the wheel 1.

In the drawing, various portions of the hydraulic flow control lines or conduits provided in the brake means of the invention are somewhat diagrammatically shown for purposes of clarity.

It should be realized that the construction of the invention may be used as a friction brake control means, when desired, or as a turbo-brake control means alone, if the combined turbo-brake and friction brake action is not required.

From the foregoing, it is believed that it will be seen that a novel and improved type of a brake means has been provided by the invention, which brake will provide an effective, correlated turbo-brake and friction brake action to stop a wheel and connected load rapidly with substantially constant deceleration. The means of the invention will control the turbo-brake to increase the action thereof as the wheel slows down and to transfer load to the friction brake under reduced wheel speed conditions.

While a certain representative embodiment and details have been shown for the purpose of illustrating the invention, it will be apparent to those skilled in this art that various changes and modifications may be made therein without departing from the spirit or scope of the invention.

What is claimed is:

1. In a turbo-brake assembly including an axle, a wheel, and means journalling said wheel on said axle,
    an impeller journalled on said axle and adapted to pull air thereto and perform work thereon,
    planetary gear means connecting said wheel to said impeller to drive it upon rotation of said wheel,
    a rotary hydraulic pump having an outlet and an output pressure proportionate to the speed of said pump,
    means connecting said pump to said planetary gear means to be driven thereby at a speed proportional to the speed of said wheel,
    a plurality of shroud means adjustably positioned adjacent said impeller to control air flow thereto, and
    control means operatively connecting said pump output to said shroud means to control the positioning thereof and to urge said shroud means towards their closed positions but to permit the opening of said shroud means as the output pressure of said pump decreases.

2. A turbo-brake as in claim 1 where friction brake means are operatively connected to said wheel,
    manually controlled hydraulic means connected to said friction brake means for actuation thereof,
    means connecting said hydraulic means to said control means to oppose said pump output pressure and urge said vanes to an open position, and
    means connecting said pump output pressure to said friction brake means to oppose actuation thereof by said hydraulic means.

3. In a turbo-brake,
    an axle,
    a wheel,
    means journalling said wheel on said axle,
    an impeller journalled on said axle,
    planetary gear means connecting said wheel to said impeller to drive it upon rotation of said wheel,
    a hydraulic pump having an outlet with an output pressure proportionate to the speed of said pump,
    means connecting said pump to said planetary gear means to be driven thereby at a speed proportional to the speed of said wheel,
    a plurality of vanes adjustably positioned for opening and closing movement adjacent said impeller to control air flow thereto, and
    control means operatively connecting said pump output to said vanes to control the opening thereof inversely dependent upon the output pressure of said pump.

4. In a turbo-brake,
    an axle,
    a wheel,
    means journalling said wheel on said axle,
    an impeller journalled on said axle,
    gear means connecting said wheel to said impeller to drive it upon rotation of said wheel,
    a rotary hydraulic pump having an outlet with an output pressure proportionate to the speed of said pump,
    means connecting said pump to said gear means to be driven thereby at a speed proportional to the speed of said wheel,
    a plurality of vanes adjustably positioned adjacent said impeller for movement from closed to open positions to control air flow to said impeller,
    control means operatively connecting said pump output to said vanes to urge them towards a closed position,
    friction brake means operatively connected to said wheel,
    manually controlled hydraulic means connecting to said friction brake means for actuation thereof,
    means operatively connecting said hydraulic means to said control means to oppose said pump output pressure and urge said vanes to an open position, and
    means connecting said pump output pressure to said friction brake means to oppose actuation thereof by said hydraulic means.

5. In a turbo-brake,
    an axle,
    a wheel,
    means journalling said wheel on said axle,
    an impeller journalled on said axle for rotation in the surrounding atmosphere,
    gear means connecting said wheel to said impeller to drive it upon rotation of said wheel for air braking action,
    a rotary hydraulic pump having an outlet with an output pressure proportionate to the speed of said pump,
    means connecting said pump to said gear means to be driven thereby at a speed proportional to the speed of said wheel,
    friction brake means operatively connected to said wheel,
    a brake cylinder operatively connected to said friction brake means,
    manually controlled hydraulic means operatively connecting to said friction brake means for actuation thereof, said hydraulic means connecting to said brake cylinder, and
    means directly connecting said pump output pressure to said brake cylinder to oppose actuation of said friction brake means by said hydraulic means.

6. In combination,
    an axle,
    a wheel,
    means journalling said wheel on said axle,
    a turbo-brake including an impeller to draw in air and discharge it at high speed after transferring energy thereto,
    gear means connecting said wheel to said impeller to drive it upon rotation of said wheel,
    friction brake means operatively engaging said wheel,
    a rotary hydraulic pump having an outlet with an output pressure proportionate to the speed of said pump,
    means connecting said pump to said gear means to be driven thereby at a speed proportional to the speed of said wheel,
    a plurality of vanes adjustably positioned adjacent said impeller for movement from closed to open positions to control air flow to said impeller,
    control means including means operatively connected to said pump outlet operatively engaging said vanes to urge them towards closed positions,
    manually controlled hydraulic means connecting to said friction brake means for actuation thereof, and
    means operatively connecting said hydraulic means to said control means to oppose said pump output pressure and urge said vanes to an open position.

7. In combination,
    an axle,
    a wheel,
    means journalling said wheel on said axle,
    a rotary hydraulic pump having an outlet with an output pressure proportionate to the speed of said pump,
    means connecting said pump to said wheel to be driven thereby at a speed proportional to the speed of said wheel,
    friction brake means operatively engaging said wheel, manually controlled hydraulic means connecting to said friction brake means for actuation thereof, and means directly connecting said pump outlet to said hydraulic means to oppose actuation of said friction brake means by said hydraulic means.

8. In an assembly including an axle, a wheel, and means journalling said wheel on said axle, a turbo-brake including a vaned impeller adapted to pull air thereinto and perform work thereon, gear means connecting said wheel to said impeller to drive it upon rotation of said wheel, a rotary hydraulic pump having an outlet with an output pressure proportionate to the speed of said pump, means connecting said pump to said gear means to be driven thereby at a speed proportional to the speed of said wheel, a plurality of circumferentially spaced shroud means adjustably positioned adjacent said impeller to control air flow thereto, and control means including a piston and a cylinder operatively connected to said pump output connecting to said shroud means to control the positioning thereof and to open said shroud means as the output pressure of said pump decreases.

References Cited by the Examiner
UNITED STATES PATENTS

| 1,886,301 | 11/32 | Peterson | 188—90 |
| 2,245,424 | 6/41 | Aikman | 303—10 |
| 2,415,670 | 2/47 | Black et al. | 186—70 |
| 3,122,220 | 2/64 | Hoffstrom | 188—90 |

FOREIGN PATENTS 471,117  8/37  Great Britain.

EUGENE G. BOTZ, *Primary Examiner.*